W. ZARLING.
TRAP.
APPLICATION FILED MAY 15, 1915.

1,245,138.

Patented Oct. 30, 1917.

Witnesses:
John Braunwalder
Joe O'Halloran

Inventor:
William Zarling
Att'y.

UNITED STATES PATENT OFFICE.

WILLIAM ZARLING, OF MILWAUKEE, WISCONSIN, ASSIGNOR OF ONE-HALF TO ALBERT A. PLAUTZ, OF MILWAUKEE, WISCONSIN.

TRAP.

1,245,138.  Specification of Letters Patent.  Patented Oct. 30, 1917.

Application filed May 15, 1915. Serial No. 28,487.

*To all whom it may concern:*

Be it known that I, WILLIAM ZARLING, a citizen of the United States, residing at Milwaukee, in the county of Milwaukee and State of Wisconsin, have invented a certain new and useful Invention in Traps, of which the following is a specification.

My invention relates to that class of devices which are used to catch mice, rats and other animals and provides means for catching a number of such animals in succession and holding them in confinement.

The object of my invention is to provide a device for catching animals of various description, and to provide means for causing each animal which is brought into confinement to reset the trap for another similar animal. Another object of my invention is to provide means for receiving a number of said animals within a removable receptacle.

I attain these objects by the device illustrated in the accompanying drawings in which—

Figure 1 is a perspective view of a trap properly set to catch mice, rats or the like.

Figure 1:
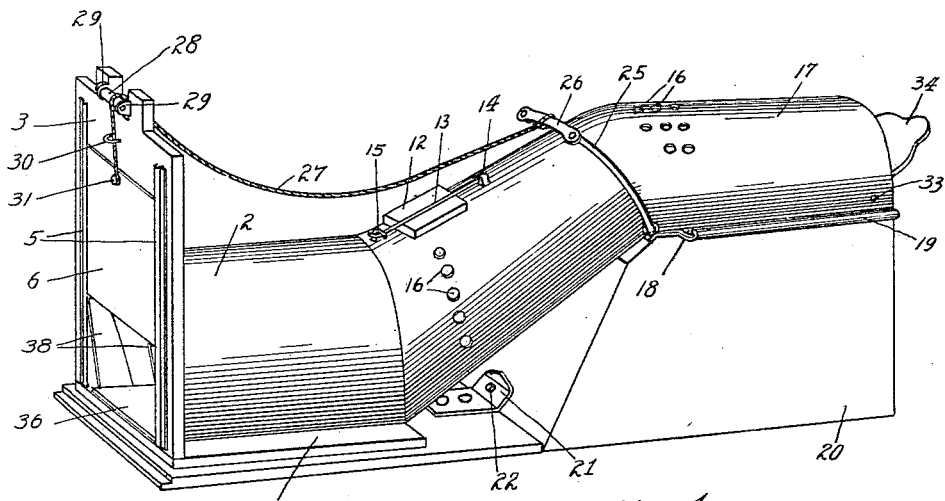
Figure 2:
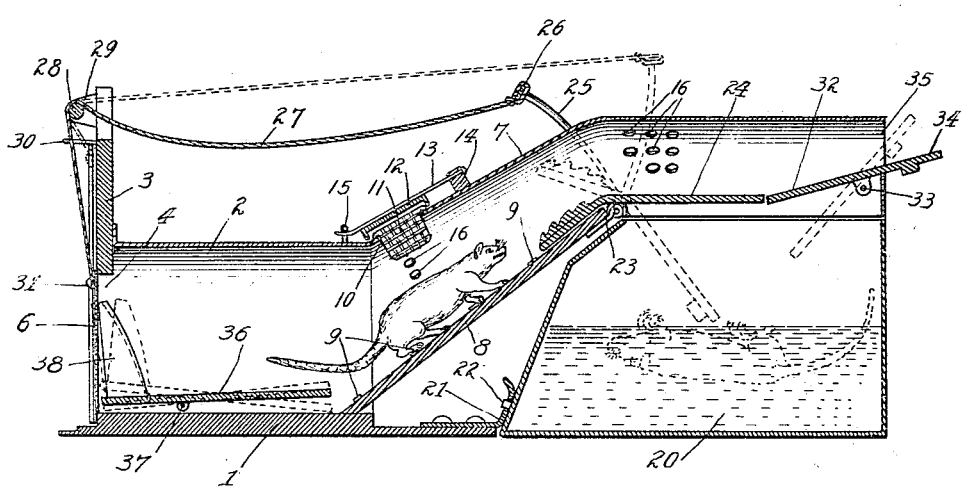
Fig. 2 is a sectional view of the trap and illustrates the condition of the confining mechanism after an animal has entered within said trap.

In the trap illustrated a suitable base 1 is provided with a hood 2, and at one end thereof with an entrance frame 3 having provided therein an opening 4. On the frame 3 and adjacent to each side of opening 4 are the guides 5 which provide means for holding in position a movable trap door 6. An upwardly directed tube 7 is attached to the other end of the hood 2 and is provided at its underside with a running board 8, having suitable cleats 9 attached to the upper side thereof to provide means for the animals to easily run to the upper end thereof.

On the upper side of said tube 7 is provided a suitable opening 10, into which fits the basket 11 of suitable form, intended to hold suitable bait to entice animals to enter within the trap. A cover 12 is provided to fit over the bait basket 11 and is held in position by the spring 13 attached to the lug 14 and the hook 15.

Vent holes 16 are provided on each side of the tube 7, to permit the scent of the bait to escape to the outside of the trap and lure the animals within same. A horizontal tube 17 is attached to the upper end of the tube 7, and has at the lower extremity at each side of said tube 17, a projecting lip 18, over which fits slidably the grooved lug 19 of the animal receptacle 20. A spring 21 which is attached to the base 1 is adapted to catch over the pin 22 of the animal receptacle 20, and to hold same in proper position with relation to the trap. At the upper end of the running board 8, is suitably attached by means of the hinge 23, a balanced trap door 24, which has securely attached thereto on each side of and extending upwardly outside of the tube 7, the arms 25, and which are connected together at their upper end by the bar 26.

To this bar 26 is attached a suitable string or rope 27, which leads over a roller 28 mounted in the bearings 29 on the frame 3, said rope 27 passing through a hook 30 attached to said frame 3, thence to a pin 31, by which said rope 27 is secured to the trap door 6.

A second trap door 32 which forms an apparently continuous surface beyond the trap door 24 is suitably hinged on the pins 33 which extend through the sides of the tube 17. A balanced extension 34 of said trap door 32 extends through the opening 35 at the end of the tube 17 and forms a suitable means to lure the captured animals upon said trap doors 24 and 32, in the hope of escaping through the opening thus provided. A tilted platform 36 is suitably mounted on the pivots 37 above the base plate 1, and has attached to each side of said tilting platform 36 an upwardly projecting wing 38, which serves the purpose of supporting the trap door 6 above the opening 4 of the frame 3 when the trap is set to catch animals. In operation when an animal enters within the trap and upon the tilting platform 36, the weight of said animal causes the tilting platform to tilt inwardly and withdraw the wings 38 from underneath the trap door 6, and causes same to descend immediately after the animal has so entered the trap.

Said animal, due to the fright caused by the knowledge of its capture will run up the inclined runway in the effort to escape through the opening 35 at the end of the tube 17, thereby mounting heavily upon the trap door 24 and the inner end of the trap door 32 causing both to descend and to close the opening 35 at the end of the tube 17 and plunging the animal into the receptacle 20 which is preferably partially filled with water in which said animals will soon drown.

When the weight of the animal tilts the trap door 24, the arms 25 with the attached bar 26 and string or rope 27 raise the trap door 6 above the point of the wings 38, and allowing same to fall underneath said trap door and support same in proper position so that another animal may enter said trap and be likewise captured.

A large number of animals may thus be captured successively and confined within the animal receptacle 20 which may at suitable times be removed and emptied of its contents.

Having thus described my invention what I claim as new, and desire to secure by Letters Patent is:

1. In a trap of the class described, a base plate, a cover secured thereto providing an inclosure, said cover extending beyond the rear end of said base plate and provided with laterally projecting guide lips, a trapping receptacle having grooved portions at its upper end slidably mounted on said guide lips, trapping mechanism within said inclosure, and means in connection with the rear end of said base plate and the forward end of said receptacle for detachably locking the latter in operative position.

2. In a trap of the class described, a base plate, a cover secured thereto providing an inclosure, said cover extending beyond the rear end of said plate, trapping mechanism within said inclosure, guide lips projecting laterally from the extended portion of said cover, a trapping receptacle having grooved portions at its upper end slidably mounted on said guide lips, a lug carried on the forward end of said receptacle and a spring locking member carried on the rear end of said base plate adapted for engagement with said lug to secure the receptacle in position.

In testimony whereof I have hereunto set my hand in the presence of two subscribing witnesses.

WILLIAM ZARLING.

Witnesses:
JOHN BRAUNWALDER,
IRENE SAMMON.

Copies of this patent may be obtained for five cents each, by addressing the "Commissioner of Patents, Washington, D. C."